United States Patent [19]

Hano et al.

[11] Patent Number: 4,948,164

[45] Date of Patent: Aug. 14, 1990

[54] ACTIVELY CONTROLLED SUSPENSION SYSTEM WITH COMPENSATION OF DELAY IN PHASE IN CONTROL SYSTEM

[75] Inventors: Sunao Hano; Naoto Fukushima; Yukio Fukunaga; Yohsuke Akatsu; Masaharu Satoh; Itaru Fujimura, all of Kanagawa, Japan

[73] Assignee: Nissan Motor Company, Limited, Yokohama, Japan

[21] Appl. No.: 302,975

[22] Filed: Jan. 30, 1989

[30] Foreign Application Priority Data

Jan. 29, 1988 [JP] Japan ................................. 63-10556
Jul. 28, 1988 [JP] Japan ........................... 63-188832[U]

[51] Int. Cl.$^5$ ............................................. B60G 11/26
[52] U.S. Cl. .................................... 280/707; 280/714; 364/424.01
[58] Field of Search ............... 280/707, 703, 688, 689, 280/840, 6.1, DIG. 1, 714; 364/424.01

[56] References Cited

U.S. PATENT DOCUMENTS

| | | | |
|---|---|---|---|
| 4,555,126 | 11/1985 | Ishimitsu et al. | 280/707 |
| 4,607,861 | 8/1986 | Eisenberg et al. | 280/689 |
| 4,613,153 | 9/1986 | Shibahata et al. | 280/689 |
| 4,616,847 | 10/1986 | Kanai et al. | 280/707 |
| 4,625,993 | 12/1986 | Williams et al. | 280/707 |
| 4,652,010 | 3/1987 | Sugasawa | 280/707 |
| 4,666,180 | 5/1987 | Skirakuma | 280/707 |
| 4,763,745 | 8/1988 | Eto et al. | 280/707 |
| 4,801,155 | 1/1989 | Fukushima et al. | 280/707 |
| 4,848,790 | 7/1989 | Fukunaga et al. | 280/707 |
| 4,865,348 | 9/1989 | Hano et al. | 280/707 |
| 4,888,696 | 12/1989 | Akatsu et al. | 364/424.05 |

Primary Examiner—Richard A. Bertsch
Attorney, Agent, or Firm—Foley & Lardner, Schwartz, Jeffery, Schwaab, Mack, Blumenthal & Evans

[57] ABSTRACT

An actively controlled suspension system which can perform precise control of suspension characteristics with satisfactory compensation of phase delay caused in a control system. The actively controlled suspension system which can successfully avoid influence of the shifting of the gravity center of a vehicle body caused by a variation of load on the vehicle. The actively controlled suspension system employs more than one lateral acceleration sensor which are oriented at axially or longitudinally shifted positions to each other. Based on the outputs of respective lateral acceleration sensors, anti-rolling suspension control signals are produced for controlling suspension characteristics of the left- and right-sides of a suspension system.

16 Claims, 14 Drawing Sheets

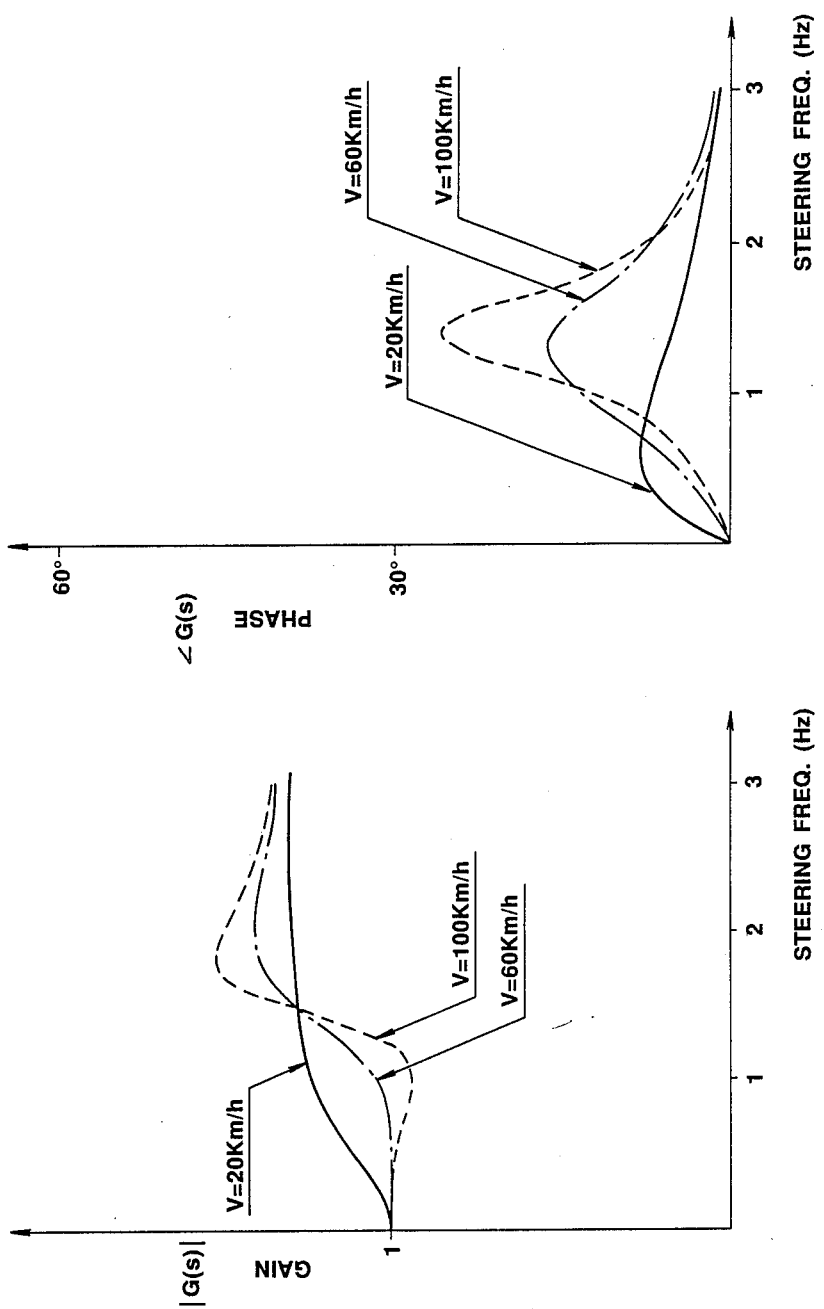

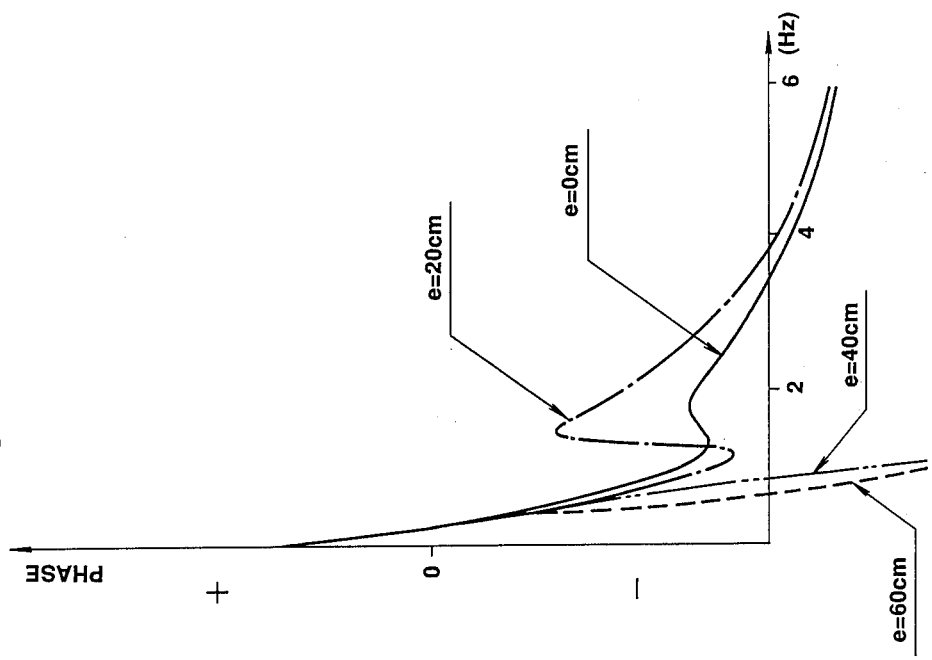
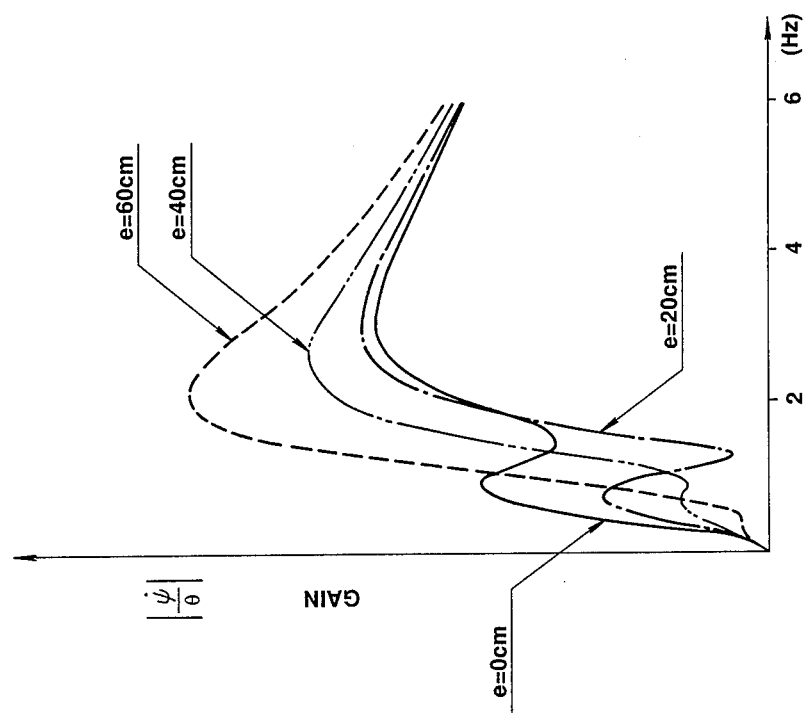

ACTIVELY CONTROLLED SUSPENSION SYSTEM WITH COMPENSATION OF DELAY IN PHASE IN CONTROL SYSTEM

BACKGROUND OF THE INVENTION

1. Field of the Invention

The present invention relates generally to an actively controlled suspension system for an automotive vehicle, which achieves suspension control depending upon vehicle driving condition for suppressing attitude change. More specifically, the invention relates to an actively controlled suspension system which may perform anti-roll suspension control with high precision irrespective of affecting factors, such as delay in phase caused in a control system, load condition on the vehicle or so forth.

2. Description of the Background Art

Japanese Patent First (unexamined) Publication (Tokkai) Showa 62-295714, which is assigned to the common assignee to the present invention, discloses one typical example of prior proposed actively controlled suspension system for performing anti-rolling and/or anti-pitching suspension controls. The disclosed system employs a lateral acceleration sensor and a longitudinal acceleration sensor for monitoring vehicular attitude change magnitude indicative parameters for performing attitude change suppressive control.

As will be appreciated, the lateral acceleration sensor employed in the actively controlled suspension system monitors lateral force exerted on the vehicular body and thereby detects the possible magnitude of vehicular rolling. The system controls suspension characteristics of respective suspension systems suspending vehicular body on front-left, front-right, rear-left and rear-right wheels. In the foregoing publication, a singular lateral acceleration sensor provides a common anti-rolling control parameter for controlling suspension characteristics of respective suspension systems.

When a single lateral acceleration sensor is to be mounted on the vehicle body, it is preferred to locate the sensor at or nearby the gravity center. When the lateral acceleration sensor is provided at the gravity center, lag factors, such as mechanical lag in control valve, phase delay in control system, will substantially affect response characteristics of anti-rolling control.

In order to improve this, it has been proposed to locate the lateral acceleration sensor at an orientation frontwardly distanced from the gravity center. In such case, a difficulty is encountered in that, since the front portion of the vehicle body is generally occupied by an automotive engine and a power transmission, an appropriate position to install the sensor is difficult to fine. Furthermore, for avoiding influence of rolling motion of the vehicular body in monitoring the lateral acceleration, the height level to install the lateral acceleration sensor has to be as close as possible to vehicular body rolling axis. This further makes it difficult to find an appropriate position to install the sensor.

In addition, as will be appreciated, the gravity center of the vehicular body shifts from an initial position depending upon load condition, such as increasing or decreasing or luggages or passengers, anti-rolling control characteristics tend to be varied in relation to position of the gravity center. This makes the vehicle driving characteristics unstable due to variation of anti-rolling characteristics.

SUMMARY OF THE INVENTION

In view of the difficulties in the prior proposed systems, it is an object of the present invention to provide an actively controlled suspension system which can perform precise control of suspension characteristics with satisfactory compensation of phase delay caused in a control system.

Another object of the invention is to provide an actively controlled suspension system which can successfully avoid influence of the shifting of the gravity center of a vehicle body caused by variation of load on the vehicle.

In order to accomplish the aforementioned and other objects, an actively controlled suspension system, according to the present invention, employs more than one lateral acceleration sensors which are criented at axially or longitudinally shifted positions to each other. Based on the outputs of respective lateral acceleration sensors, anti-rolling suspension control signals are produced for controlling suspension characeristics of respective left- and right-sides suspension sysems.

According to one aspect of the invention, an actively controlled suspension system for an automotive vehicle, comprises a cylinder disposed between a vehicle body and a suspension member which rotatably supports a road wheel, the cylinder defining a variable pressure working chamber filled with a pressure medium for generating a damping force resisting against relative displacement between the vehcicle body and the suspension member, the pressure of the pressure medium being variable between a predetermined maximum value and a predetermined minimum value across a predetermined neutral value a pressure source circuit means connected to the working chamber for supplying the pressure medium and including a pressure source feeding pressurized pressure medium through the circuit a pressure control valve disposed between the pressure source and the working chamber, the pressure control valve being capable of varying valve positions between a first mode for increasing pressure of the pressure medium within the working chamber, a second mode for decreasing pressure in the pressure within the working source, and a third mode for maintaining the pressure in the pressure medium constant a first acceleration sensor for monitoring an acceleration exerted on the first position of the vehicle body to cause vehicular attitude change and producing a first sensor signal indicative thereto a second acceleration sensor oriented at a second position which is longitudinally distance from the first acceleration sensor, for monitoring the acceleration exerted on the second position of the vehicle body and producing a second sensor signal indicative thereof and controller means for receiving the first and second sensor signals for deriving a suspension control signal for operating the pressure control valve at one of the first, second and third mode positions for regulating vehicular attitude on the basis of the first and second sensor signals.

According to another aspect of the invention, an anti-rolling suspension control system for an automotive vehicle, comprises a cylinder disposed between a vehicle body and a suspension member which rotatably supports a road wheel, the cylinder defining a variable pressure working chamber filled with a pressure medium for generating a damping force resisting against relative displacement between the vehicle body and the suspension member, the pressure of the pressure medium being variable between a predetermined maximum value and a predetermined minimum value across a predetermined neutral value. A pressure source circuit means connected to the working chamber for supplying the pressure medium and including a pressure source feeding pressurized pressure medium through the circuit a pressure control valve disposed between the pressure source and the working chamber and capable of varying valve positions between a first mode for increasing pressure of the pressure medium within the working chamber, a second mode for decreasing pressure in the pressure within the workding source, and a third mode for maintaining the pressure in the pressure medium constant a first lateral acceleration sensor for monitoring lateral acceleration exerted on the first position of the vehicle body to cause vehicular attitude change and producing a first sensor signal indicative thereof;

a second lateral acceleration sensor oriented at a second position which is longitudinally distanced from the first lateral acceleration sensor, for monitoring the lateral acceleration exerted on the second position of the vehicle body and producing a second sensor signal indicative thereof; and a controller means for receiving the first and second sensor signals for deriving a suspension control signal for operating the pressure control valve at one of the first, second and third mode positions for regulating vehicular attitude on the basis of the first and second sensor signals.

The first and second lateral acceleration sensors may be arranged at the first and second positions both of which are frontwardly distanced from an initial gravity center which is determined at a standard load condition of the vehicle and at the neutral value of pressure of the pressure medium in the working chamber. The anti-rolling suspension control system may further include vehicle height sensors for monitoring the vehicular height level at front and real wheels of the vehicle, and the controller means performs the height regulating mode operation for adjusting the pressure of the pressure medium in the working chamber by controlling the operation of the pressure control valve means so that the vehicular height at the front and rear wheels is maintained at a predetermined height position. The hydraulic cylcinder and the pressure control valve means are provided for each of suspension systems respectively associated with the front and rear wheels, and the controller means detects load distribution between the front and rear wheels on the basis of the pressure of the pressure medium of working chambers of respective hydraulic cylinders and determines a longitudinal position to monitor the lateral acceleration, the controller means derives the lateral acceleration at the londitudinal position on the basis of the first and second sensor signals and known distance of the longitudinal position relative to the first and second positions.

Alternatively, the first sensor is arranged at the first position frontwardly distanced from a gravity center of the vehicle body and the second sensor is arranged at the second position rearwardly distanced from the gravity center. The hydraulic cylinder and the pressure control valve means are provided for each of suspension systems respectively associated with the front and rear wheels, and the controller means derives the suspension control signal for the pressure control valve means associated with the suspersion systems of the front wheels on the basis of the first sensor signal and the suspension control signal for the pressure control valve means associated with the suspension systems of the rear wheels on the basis of the second sensor signal. The first and second lateral acceleration sensors are respectively oriented at first and second positions respectively corresponding to longitudinal positons of centers of the front and rear wheels. The first and second lateral acceleration sensors are respectively oriented at the first and second positions having known distance to the gravity center and known distance to the longitudinal positions of centers of the front and rear wheels, and the controller means derives lateral acceleration at respective centers of the front and rear wheels by extrapolation and derives the suspension control signals on the basis of the extrapolated values.

BRIEF DESCRIPTION OF THE DRAWINGS

The present invention will be understood more fully from the detailed description given herebelow and from the accompanying drawings of the preferred embodiments of the invention, which, however, should not be taken to limit the invention to the specific embodiment but are for explanation and understanding only.

In the drawings:

FIGS. 11(a) and 11(b) are graphs showing variation of gain and phase in the response transferring coefficient of the output of lateral acceleration sensor taking vehicular speed as a parameter;

FIGS. 13(a) and 13(b) are graphs showing the response transferring coefficient of rolling rate versus actual steering angle;

DESCRIPTION OF THE PREFERRED EMBODIMENT

Figure 1:
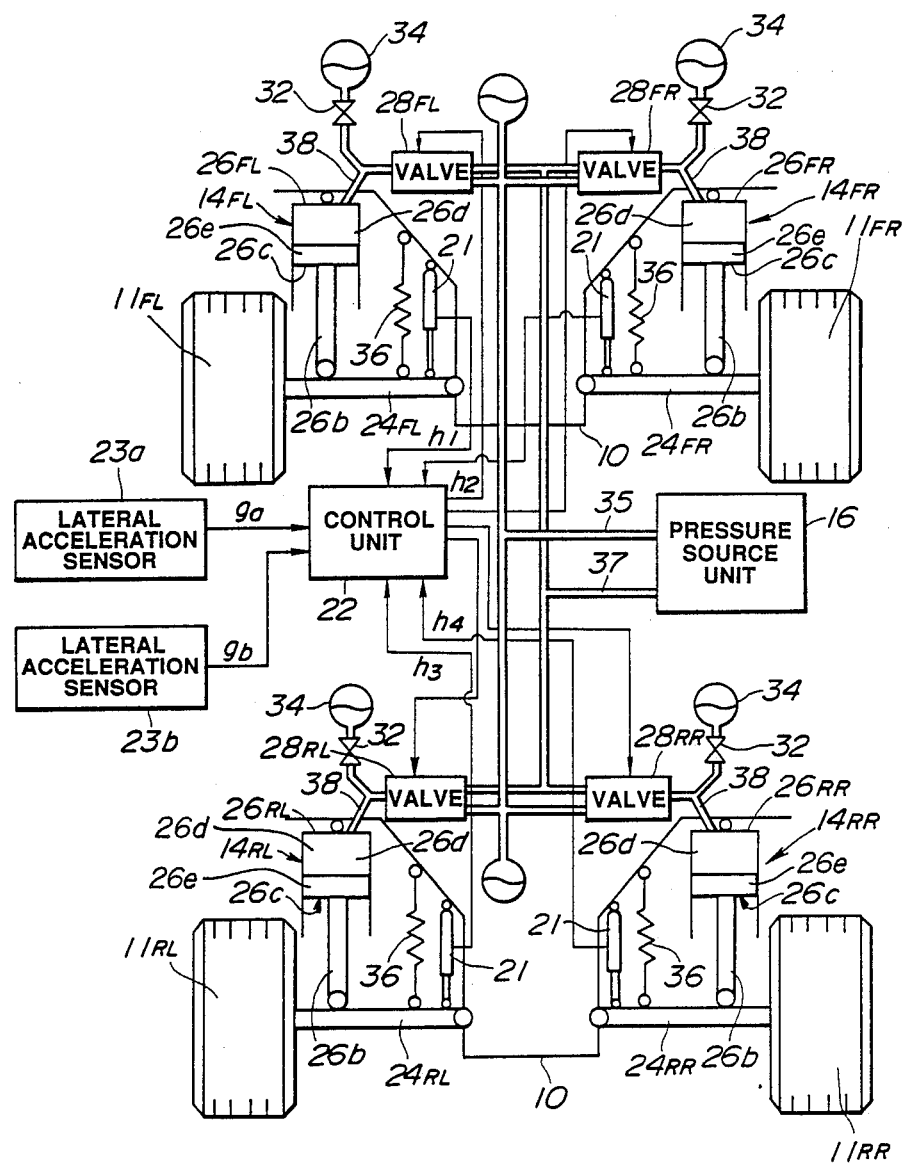
FIG. 1 is an illustration of the overall construction of the preferred embodiment of an actively controlled suspension system according to the present invention.

Referring now to the drawings, particularly to FIG. 1, the prefered embodiment of an actively controlled suspension system, according to the present invention, is designed to generally perform suspension control for suppressing relative displacement between a vehicle body 10 and suspension members 24FL, 24FR, 24RL and 24RR provided in front-left, front-right, rear-left and rear-right suspension mechanisms 14FL, 14FR, 14RL and 14RR and rotatably supporting front-left, front-right, rear-left and rear-right wheels 11FL, 11FR, 11RL and 11RR, which suspension member will be represented by the reference numeral "24" as generally referred to, and suspension mechanisms will be represented by the reerence numeral "14" as generally referred to, and whereby suppressing vehicle body attitude change. Respective front-left, front-right, rear-left and rear-right suspension mechanisms 14FL, 14FR, 14RL and 14RR include hydraulic cylinders 26FL, 26FR, 26RL and 26RR, which hydraulic cylinder will be hereafter represented by the reference numeral "26" as generally referred to.

Each of the hydraulic cylinder 26 is disposed between the vehicle body 10 and the suspension member 24 to produce a damping force for suppressing relative displacement between the vehicle body and the suspension member. The hydraulic cylinder 26 has a cylinder body 26a. The cylinder body 26a defines a working fluid chamber therein. A piston 26c is disposed within the working fluid chamber to divide the working fluid chamber into a upper working chamber 26d and a lower reference pressure chamber 26e. The working chamber 26d and the reference pressure chamber 26e are communicated with each other via an orifice defined through the piston 26c. The piston 26c is connected to an associated one of the suspension members 24FL, 24FR, 24RL and 24RR via a piston rod 26b. A suspension coil spring 36 is provided in parallel to each of the hydraulic cylinder 26. The suspension coil spring 36 employed in the shown type of the suspension is not required to have a resilient force sufficient for damping relative displacement between the vehicle body and the associated suspension member.

The working chamber 26d of each hydraulic cylinder 26 is connected to a hydraulic pressure source unit 16 via a pressure supply line 52, a pressure drain line 54, a pressure control valve units 28FL, 28FR, 28RL and 28RR and a pressure control line 38, which pressure control valve units will be hereafer represented by the reference numeral "28" as generally referred to, and a pressure line 38. As seen from FIGS. 1 through 3, the pressure line 38 is connected to a fluid path 26g defined through the piston rod 26b and the piston 26c. The working chamber 26d of the hydraulic cylinder 26 is further communicated with a pressure accumulator 34 via an orifice 32. Another pressure accumulators 18 are provided in the pressure supply line 52 for accumulatin the excessive pressure generaged by the pressure surce unit 16.

The pressure control valve unit 28 includes a proportioning valve and is designed to be controlled by an electric control signal for varying valve position according to variation of the current value of the control sinal. Generally, the pressure control valve unit 28 controls the magnitude of introduction and draining of the pressurized working fluid into and from the working chamber 26d for adjusting the pressure in the working chamber for setting the damping mode of the hydraulic cylinder 26. To control the valve position of the pressure control valve unit 28, a control unit 22 which comprises a microprocessor, is provided.

The control unit 22 (FIG. 4) is connected to various sensors which monitor vehicle body attitude change representative parameters to produce sensor signals. The sensors may include vehicular height sensors 21 for monitoring the stroke of relative motion between the vehicle body and the suspension members 24 to produce vehicle height indicative sensor signals, and lateral acceleration sensors 23a and 23b which are designed for monitoring lateral acceleration exerted on the vehicle body to produce lateral acceleration indicative signals. While the shown embodiment employs the vehicle height sensor as the vehicular attitude change indicative parameter, the similar vehicular height indicative parameter can be monitored by a vertical acceleration sensor which monitors vertical acceleration exerted to the vehicle body, to produce vertical acceleration indicative signal for bouncing control for suppressing bounding and rebounding motion of the vehicle body. In addition, a longitudinal acceleration sensor for monitoring longitudinal acceleration exerted on the vehicle body as vehicular pitching representative parameter may be employed for anti-pitching and anti-rolling control. Furthermore, other sensors, such as a vehicular speed sensor, steering angle sensor and so forth which monitor vehicular driving condition affecting vehicular attitude may also be employed for performing various suspension control.

Figure 2:
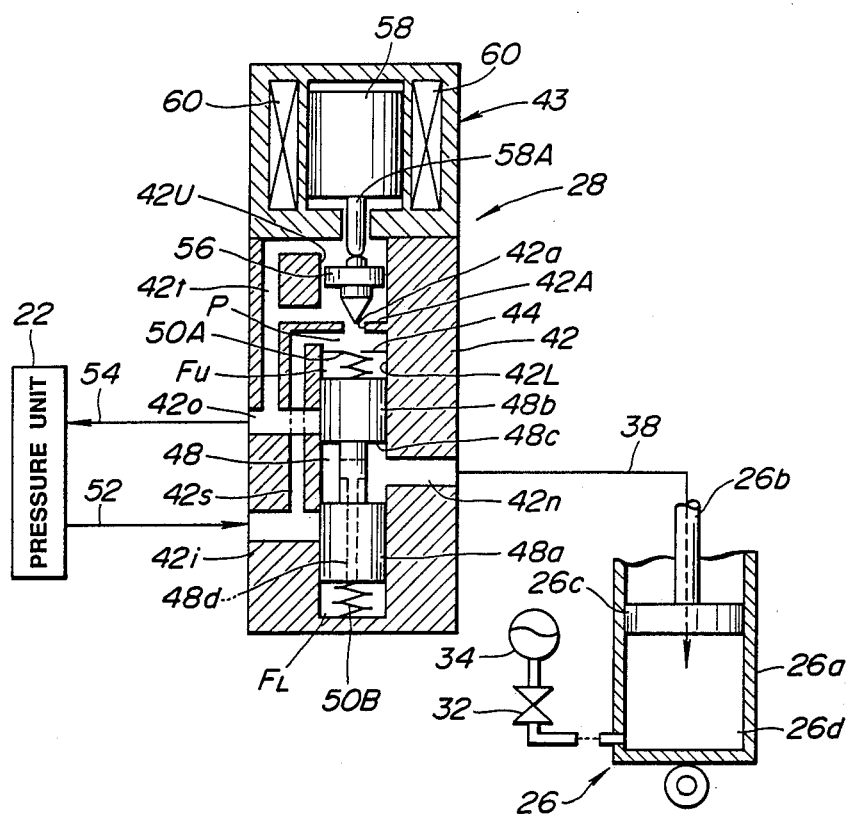
FIG. 2 is a sectional view of a pressure control valve employed in the preferred embodiment of the actively controlled suspension system of FIG. 1.

FIG. 2 shows the detailed construction of the pressure control valve unit 28 to be employed in the shown embodiment of the actively controlled suspension system set forth above.

The pressure control valve 28 comprises a valve housing 42 which housing a proportioning solenoid 43. The proportioning solenoid 43 is electrically connected to the control unit 22. The valve housing 42 defines a valve bore which is separated into a valve chamber 42L and a control chamber 42U by means of a partitioning member 42A. The partitioning member 42A is formed with a communication hole 42a. Above the communication hole 42a is defined the control chamber 42U. The valve chamber 42L and the control chamber 42U are aligned to each other across the communication hole 42a. Beneath the communication hole 42a and adjacent the top of the valve chamber 42L, a stationary throttling orifice defining member 44 is provided. The throttling orifice defining member 44 is formed with a fixed throttling rate of orifice. The throttling orifice defining member 44 defines with the partitioning member 42A a pilot chamber P.

A valve spool 48 is thrustingly or slidingly disposed within the valve chamber 42L. The valve spool 48 defines an upper feedback chamber FU between the top end thereof and the throttling orifice defining member 44. The valve spool 48 also defines a lower feedback chamber FL between the lower and thereof and the bottom of the valve chamber 42L. Offset springs 50A and 50B are disposed within the upper and lower feedback chambers FU and FL, which offset springs exerts spring force to the valve spool 48 for resiliently restricting movement of the latter. The valve chamber 42L is communicated with an inlet port 42a, a drain port 42o and the communication port 42n which are defined through the valve housing 42. The inlet port 42i is connected to the pressure unit 16 via a supply line 52. On the other hand, the drain port 42o is connected to the pressure unit 16 via the drain line 54.

The valve spool 48 is formed with an upper line 48b and a lower land 48a. The upper and lower lands 48b and 48a defines therebetween an annular pressure chamber 48c. The valve spool 48 is formed with a pilot path communicating the pressure chamber 48c with the lower feedback chamber FL.

A poppet valve member 56 is disposed within the control chamber 42U for thrusting or sliding movement therein. The poppet valve member 56 has a valve head opposing to the communication hole 42a. The poppet valve member 56 is operably associated with the proportioning solenoid 43 which comprises a plunger 58 which has a plunger rod 58A. The lower end of the plunger rod 58A of the plunger 58 opposes to the top end of the poppet valve 56. The poppet valve member 56 is driven by the plunger 58 to control the path area in the communication hole 42a according to the position of the plunger rod 58A. Therefore, the poppet valve member 56 adjusts the path area of the communication hole 42a and thereby controlling fluid pressure to be introduced in the pilot chamber P. poppet valve member 56 separates the control chamer 42U into upper and lower control chambers. In order to control the position of the poppet valve 56 for adjusting the pilot pressure in the pilot chamber P, a solenoid coil 60 is provided for energizing the deenergizing to cause axial shift of the plunger rod 58A.

By adjusting the fluid pressure in the pilot chamber P, the pressure in the upper feedback chamber FU is adjusted to exert an axially driving force to the valve spool 48 to cause axial shift. By this, selective fluid communication between the inlet port 42i, the drain port 42o and the communication port 42n can be established to adjust the fluid pressure at the communication port 42n. Since the pressure at the communication port 42n is equal to the fluid pressure in the working chamber 26d of the pressure cylinder 26, the damping force created by the pressure cylinder can be adjusted. The inlet port 42i is also connected to the pilot chamber P via a fluid path 42s. On the other hand, the drain port 42o is connected to control chamber 42U via a fluid path 42t.

Figure 3:
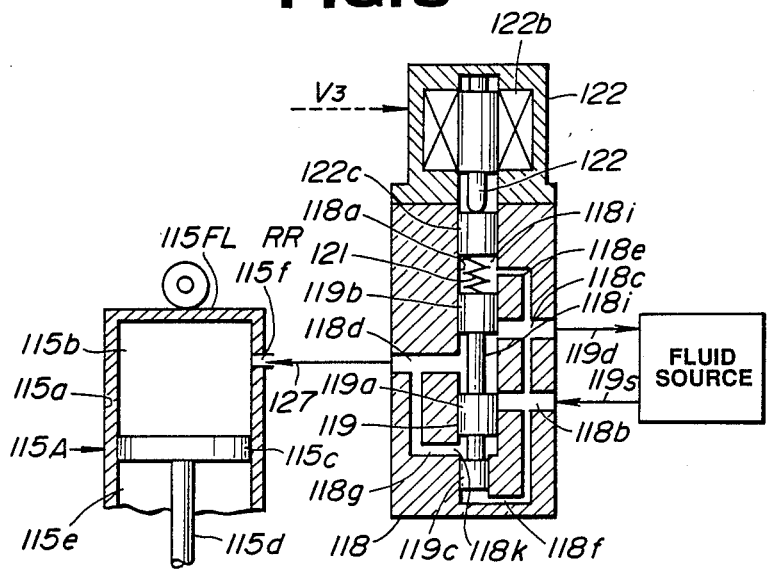
FIG. 3 is another embodiment of the pressure control valve to be employed in the preferred embodiment of the actively controlled suspension system of FIG. 1

In order to control the pressure at the communication port 42n, a control current I is applied to the solenoid coil FIG. 3 shows alternative embodiment of the pressure control valve unit 28 to be employed in the preferred embodiment of the actively controlled suspension system, according to the invention.

FIG. 3 shows the detailed construction of the hydraulic cylinder 115A and the pressure control valve 22. As will be seen from FIG. 3, the hollow cylinder housing 115a is formed with a port 115f communicating the upper fluid chamber 15d to an outlet port 118d of the pressure control valve 22 via a communication line 127. Through FIG. 3 does not show clear construction, the lower fluid chamber 115e is defined as an enclosed space and is filled with the viscous working fluid. The pressure of the working fluid in the lower fluid chamber 115e at an initial position of the piston 115c serves as a reference pressure and per se serves as resistance for downward movement of the piston.

The pressure control valves 22 has a valve housing 18A having the aforementioned outlet port 118d, an inlet port 118b and a drain port 118c. Respective inlet port 118b, the drain port 118c and the outlet port 118d are connected to a valve bore 118a defined within the valve housing 118A. A valve spool 119 is disposed within the valve tore 118a for thrusting movement therein. The valve spool 119 has first, second and third lands 119a, 119b and 119c. As will be seen from FIG. 3, the third land 119c has smaller diameter than that of the first and second lands 119a and 119b. The third land 119c defines a fifth pressure control chamber 118h which is connected to the drain port 118c via a drain path 118f. An actuator piston 122c is also disposed within the valve bore 118a. The actuator piston 122c opposes the second land 119b in spaced apart relationship to define a second pressue control chamber 118i which is connected to the drain port 118c via a drain path 118e. An annular pressue chamber 118j is defined between the first and second lands 119a and 119b. The pressure chamber 118j is constantly communicated with the outlet port 118d and thereby communicated with the upper fluid chamber 115d. On the other hand, the pressure chamber 118j shifts according to shifting of the valve spool 119 to selectively communicate with the inlet port 118b and the drain port 118c. On the other hand, a pressure control chamber 118k is defined between the first and thrid lands 119a and 119c. The pressure control chamber 118k is in communication with the outlet port 118d via a pilot path 118g. A bias spring 122d is interposed between the actuator piston 122c and the valve spool 119. The actuator piston 122c contacts with an actuator rod 122a of an electrically operable actuator 122 which comprises an electromagnetic solenoid. The solenoid 122 comprises a proportioning solenoid.

In order to increase the supply pressure of the working fluid, the spool valve 119 is shifted to the position to increase path area at a throttle constituted at the inner end of the inlet port 118b by means of the land 119a of the spool valve 119. On the other hand, in order to decrease the supply pressure of the working fluid, the spool valve is shifted to the position to decrease the path area at the throttle of the inner end of the inlet port 118b and opens the drain port 118 which is normally blocked by means of the land 119b of the spool valve.

As seen from FIG. 3, the proportioning solenoid 122 comprises the actuator rod 122a and a solenoid coil 122b. The solenoid coil 122b is energized by a suspension control signal from the control unit. In the shown embodiment of the pressure control valve, the working fluid pressure P at the outlet port 118d is variable according the predetermined variation characteristics. Namely, when the control value represented by the suspension control signal is zero, the pressure at the outlet port 118 becomes an initial pressure determined according to a predetermined offset pressure. When the suspension control signal value in positive value increases, the fluid pressure at the outlet port 118d increases with a predetermined proportioning rate. Namely, by increasing of the suspension control value, the actuator rod 122a is driven downwardly in FIG. 3 at a magnitude toward to position to achieve increasing of the fluid pressure with the predetermined proportioning rate. The fluid pressure at the outlet port 118d saturate at the output pressure of the pressure unit. On the other hand, when the suspension control signal value decreases, the pressure decreases to zero to by shifting of the actuator rod 122a.

The actuator rod 122a of the proportioning solenoid 122 is associated with the actuator piston 122c. Contact between the actuation rod 122a and the actuator piston 122c can be maintained by the resilient force of the bias spring 122d which normally biases the actuator piston toward the actuation rod. On the other hand, the spring force of the bias spring 122d is also exerted on the valve spool 119 to constantly bias the valve spool downwardly in FIG. 3. The valve spool 119 also receives upward hydraulic force from the pressure control chamber 118k. Therefore, the valve spool 119 is oriented at the position in the valve bore at the position where the downward bias of the bias spring 122d balances with the upward hydraulic force of the pressure control chamber 118k.

Figure 4:
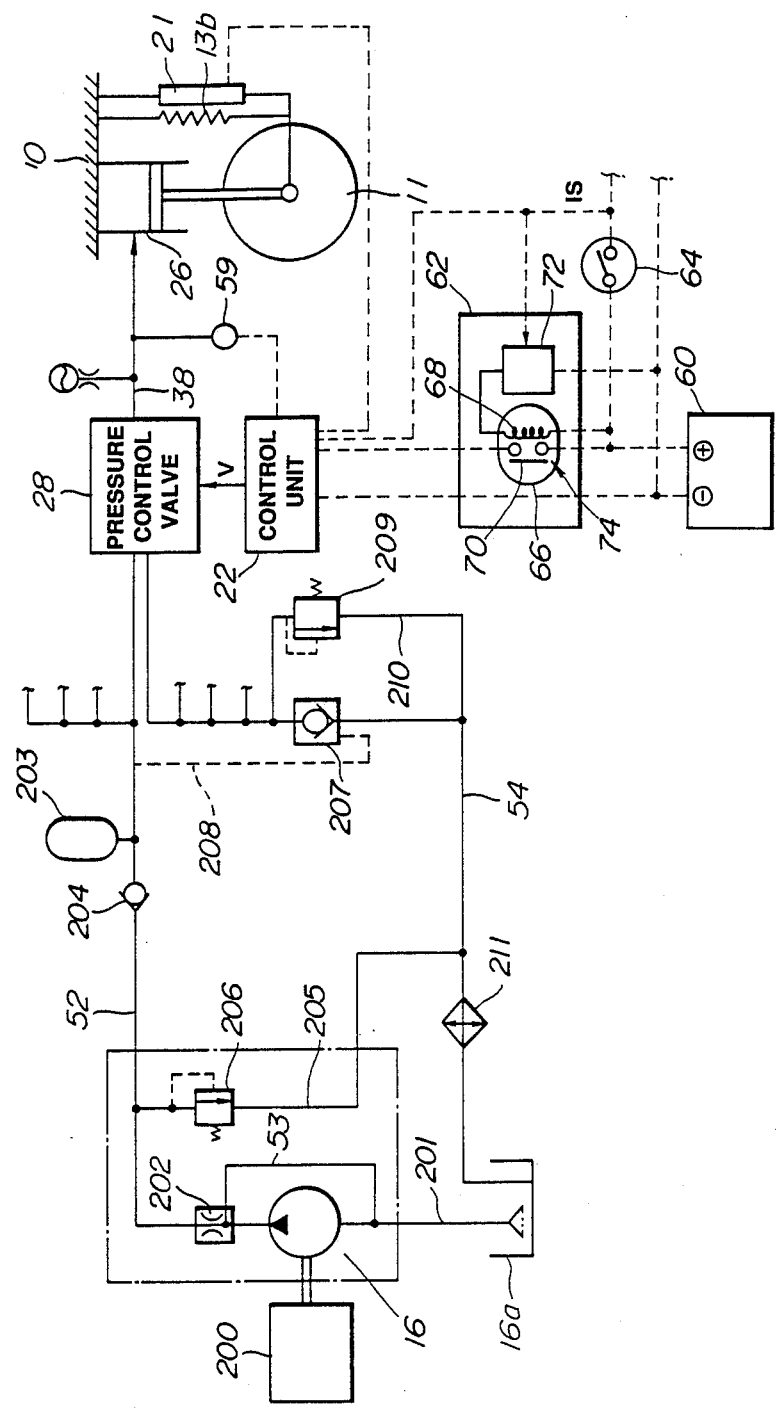
FIG. 4 is a circuit diagram of a hydraulic circuit to be employed in the preferred embodiment of the actively controlled suspension system according to the present invention.

FIG. 4 is a circuit diagram of a hydraulic circuit including the pressure source unit 16 and the working fluid chamber 26d of the hydraulic cylinder 26.

FIG. 4 shows detailed circuit construction of the preferred embodiment of the hydraulic system to be employed in the suspension control system according to the invention. As set forth, the pressure source unit includes the pressure unit 16 which comprises a fluid pump, and is connected to the reservoir 16a via a suction pipe 201 which is driven by means of an automotive engine 200. The outlet of the pressure unit 16, through which the pressurized working fluid is fed, is connected to the inlet port 42i of the pressure control valve 18 via the supply line 52. A pressure regulating orifice 202 is disposed in the supply line 52 for suppressing pulsatile flow of the working fluid and thereby regulating the output pressure of the pressure unit 16 to be delivered to the pressure control valve 28. A feedback line 53 is connected to the upstream of the pressure regulating orifice 202 at one end. The other end of the feedback line 53 is connected to the upstream of the inlet of the pressure unit 16. Therefore, excessive fluid between the pressure unit 16 and the orifice 202 is fed back to the inlet side of the pressure unit.

A pressure accumulator 203 is also connected to the supply line 52 to receive therefrom the pressurized fluid for accumulating the pressure. An one-way check valve 204 is disposed in the supply line 52 at the position upstream of the junction between the pressure accumulator 203 and the supply line 52.

A pressure relief line 205 is also connected to the supply line 52 at the position intermediate between the pressure regulating orifice 202 and the one-way check valve 204, at one end. The other end of the pressure relief line 205 is connected to the drain line 54. A pressure relief valve 206 is disposed in the pressure relief line 205. The pressure relief valve 206 is responsive to the fluid pressure in the supply line 52 higher than a given value to the drain part of the working fluid to the drain line for maintaining the pressure in the supply line 52 below the given pressure value.

On the other hand, a shut-off valve 207 is disposed in the drain line 54. The shut-off valve 207 is also connected to the supply line 52 upstream of the one-way check valve 204 to receive therefrom the pressure in the supply line as a pilot pressure, via pilot line 208 (in plantom). The shut-off valve 207 is designed to be maintained at open position as long as the pilot pressure to be introduced through the pilot line 208 is held at a pressure level higher than or equal to a given pressure level. At the open position, the shut-off valve maintains fluid communication between the inlet side and outlet side thereof so that the working fluid in the drain line 54 may flow therethrough to the reservoir tank 16a. On the other hand, the shut-off valve 207 is responsive to when the pilot pressure drops below the given pressure level to be switched into the shut-off position. At the shut-off position, the shut-off valve blocks fluid communication between the drain port 42o and the reservoir tank 16a.

In parallel relationship to the shut-off valve, a pressure relief valve 209 is provided. The pressure relief valve 209 is disposed in a by-pass line 210 connecting the upstream side and downstream side of the shut-off valve 207. The pressure relief valve 209 is normally held at closed position to block fluid communication therethrough. On the other hand, the pressure relief valve 209 is responsive to a fluid pressure in the drain line 54 upstream thereof, higher than a set pressure, e.g. 30 kgf/cm$^2$, in order to establish fluid communication between the upstream side and downstream side of the shut-off valve to allow the excessive pressure at the upstream side drain line 54 to be drained therethrough. Therefore, the pressure relief valve 209 limits the maximum pressure at the set pressure. The set pressure of the pressure relief valve 209 corresponds to a predetermined offset pressure.

An oil cooler 211 is disposed in the drain line 54 for cooling the working fluid returning to the reservoir tank 16a.

Pressurized fluid supply operation to be taken place by the pressure source unit as set forth above will be discussed herebelow.

While the automotive engine 200 is running, the fluid pump as the pressure unit 16 is driven. Therefore, the working fluid in the reservoir tank 16a is sucked via the suction pipe 201 and pressurized through the pressure unit 16. The pressurized working fluid is discharged from the outlet of the pressure unit 16 and fed to the pressure control valve 28 via the supply line 54 including the pressure regulating orifice 202 and the one-way check valve 204. When the pressure control valve 28 is in a position as shown in FIG. 2, the pressurized working fluid passes the pressure control valve and is introduced into the working chamber 26d of the hydraulic cylinder 26. On the other hand, when the pressure control valve 28 is shifted to block communication between the supply line 52 and the working chamber 26d, the line pressure in the supply line increases. When the line pressure in the supply line 52 becomes higher than a set pressure of the pressure relief valve 206 in the pressure relief line 205, the excessive pressure higher than the set pressure is fed to the drain line 54 via the pressure relief valve 206 and thus returned to the reservoir tank 16a.

The fluid pressure in the supply line 52 is also fed to the shut-off valve 207 via the pilot line 208. As set forth, the shut-off valve 207 is placed at open position as long as the pilot pressure introduced through the pilot line 208 is held higher than or equal to the set pressure thereof. Therefore, fluid communication between the pressure control valve 28 and the reservoir tank 16a is maintained. At this position, the working fluid is thus returned to the reservoir tank 16a via the drain line 54 via the shut-off valve 207 and the oil cooler 211.

The shut-off valve 207, even at the open position, serves as a resistance to the fluid flow. Therefore, the fluid pressure in the drain line 54 upstream of the shut-off valve 207 becomes excessively higher, i.e. higher than the off-set pressure $P_O$. Then, the pressure relief valve 209 becomes active and opens to allow the excessive pressure of the working fluid to flow through the by-pass line 210.

When the engine 200 stops, the pressure unit 16 ceases operation. By stopping of the pressure unit 16, the working fluid pressure in the supply line 52 drops. According to the drop of the pressure in the supply line 52, the pilot pressure to be exerted to the shut-off valve 207 via the pilot line 208 drops. When the pilot line 208 drops below or equal to the set pressure, the shut-off valve 207 is switched into shut-off position to block fluid communication therethrough. As a result, the fluid pressure in the drain line 54 upstream of the shut-off valve 207 becomes equal to the pressure in the working chamber 26d. Therefore, even when the working fluid leaks through a gap between the spool valve 48 and the inner periphery of the valve bore, it will not affect the fluid pressure in the working chamber 26d.

This is advantageous to maintaining the suspension characteristics of the suspension systems irrespective of the engine driving condition.

Figure 5:
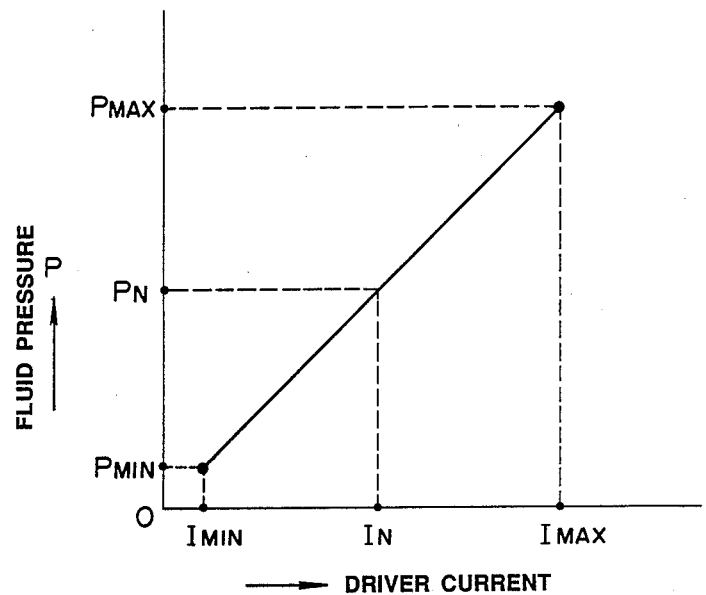
FIG. 5 is a chart showing relationship between an electric current value of a control signal to be output by a control unit and a hydraulic pressure in a pressure chamber of a hydraulic cylinder.

As seen from FIG. 5, the working fluid pressure in the working chamber 26d of the hydraulic cylinder 26 varies according to variation of the current value of the control signal applied to the pressure control valve unit 28. As seen from FIG. 5, hydraulic pressure in the working chamber 26d varies between a maximum pressure $P_{max}$ which is the saturation pressure of the pressure source unit 16 and a minimum pressure $P_{min}$ which is set at a magnitude in view of a noise component to be contained in the control signal. As seen from FIG. 5, the maximum hydraulic pressure $P_{max}$ corresponds to the maximum current value $I_{max}$ of the control signal and the minimum hydraulic pressure $P_{min}$ corresponds to the minimum current value $I_{min}$ of the control signal. Furthermore, the hydraulic pressure level as labeled $P_n$ represents neutral pressure at the neutral current $I_n$. As seen, the neutral current value $I_n$ is set at an intermediate value between the maximum current value $I_{max}$ and the minimum current value $I_{min}$.

In the shown embodiment, the lateral acceleration sensors 23a and 23b are oriented at longitudinally distanced positions in relation to each other substantially on the longitudinal axis. As clear from FIG. 6, the lateral acceleration sensors 23a and 23b are frontwardly distanced from the gravity center at the initial condition of the vehicle where no load is applied to the vehicle. The distance from the gravity center to respective lateral acceleration sensors 23a and 23b are respectively a and b which is smaller than a. These lateral acceleration sensors 23a and 23b monitor lateral accelerations exerted on the corresponding orientations of the vehicular body. According to monitored lateral accelerations at the positions of the sensors 23a and 23b, lateral acceleration indicative signals ga and gb are generated.

Figure 7:
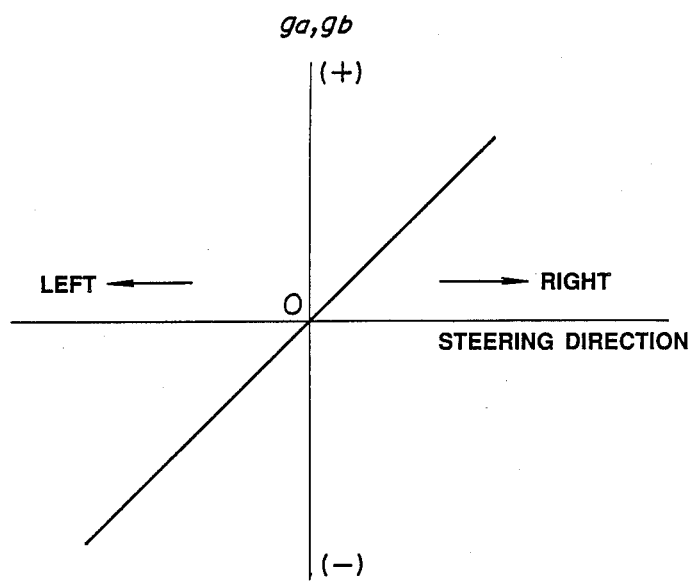
FIG. 7 is a chart showing the relationship between lateral acceleration caused by steering operation and output signal values of the lateral acceleration sensors.

As seen from FIG. 7, the signal values of the lateral acceleration indicative, signal ga and gb are positive when lateral acceleration is in the right in response to right-hand steering is exerted, and negative when lateral acceleration in left in response to the left-hand steering is exerted. The absolute value of each of the lateral acceleration signals ga and gb varies in proportion to a variation of the magnitude of lateral acceleration.

On the other hand, respective vehicle height sensors 21 monitor relative distance between the suspension member 24 and the vehicular body 10 at respective relevant suspension systems 14.

Figure 8:
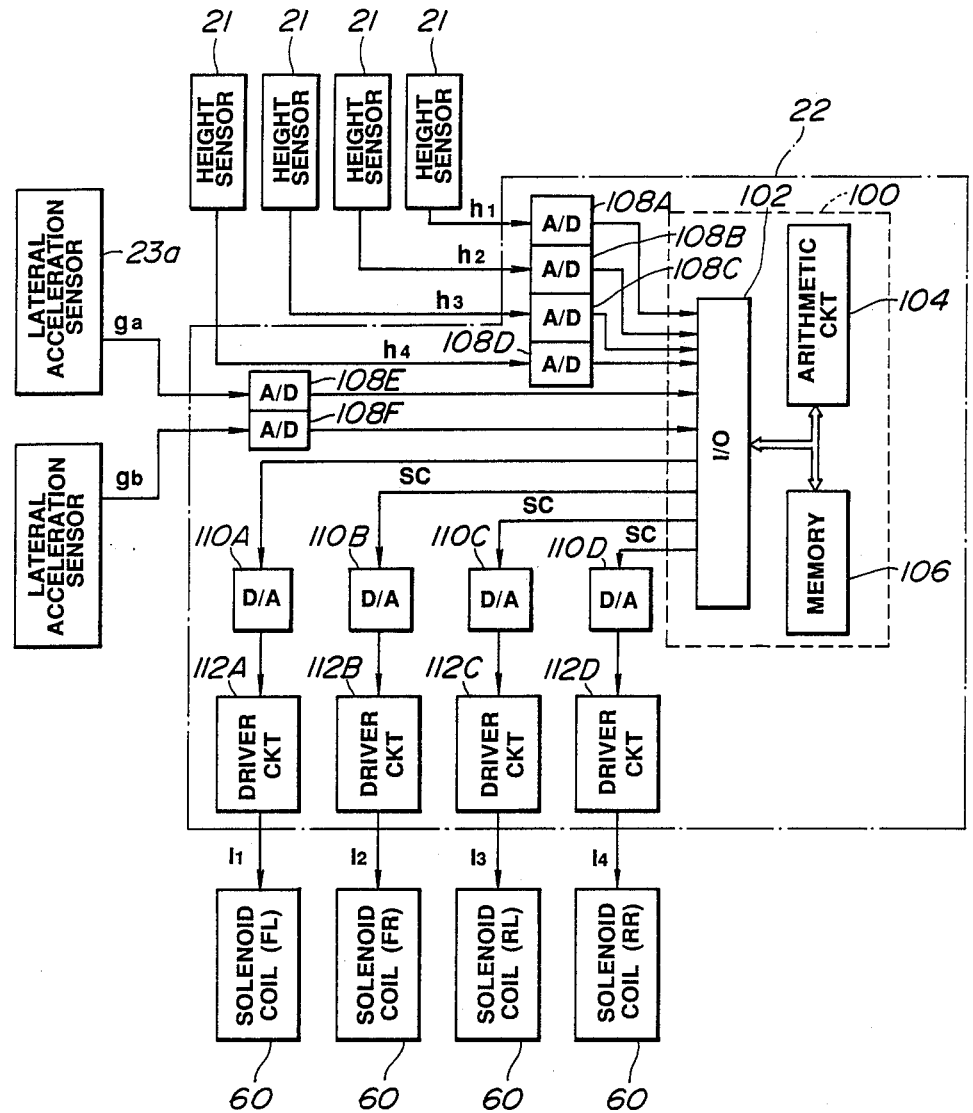
FIG. 8 is a block diagram of the preferred construction of a suspension control system which is employed in the preferred embodiment of the actively controlled suspension system of FIG. 1.

FIG. 8 schematically shows circuit construction of the preferred embodiment of the suspension control system employed in the shown embodiment of the actively controlled suspension system of FIG. 1 set forth above. The control unit 22 includes a microprocessor 100 as a main component of the control unit. The microprocessor 100 has per se well known construction including an input/output interface (I/O) 102, an arithmetic circuit 104 and a memory unit 106 mutually connected to each other via bus lines. The input/output interface 102 is connected to a plurality of analog-to-digital (A/D) converters 108A, 108B, 108C, 108D, 108E and 108F. The A/D converters 108A, 108B, 108C and 108D are respectively connected to the vehicle height sensors 21 of respective suspension systems 14FL, 14FR, 14RL and 14RR to receive therefrom the analog form vehicular height indicative signals $h_1$, $h_2$, $h_3$ and $h_4$ and convert into digital signals having corresponding values. On the other hand, the A/D converters 108E and 108F are connected to the lateral acceleration sensors 23a and 23b for receiving the analog form lateral acceleration indicative signals ga and gb and converting into digital signals indicative thereof.

The input/output interface 102 is also connected to a plurality of digital-to-analog (D/A) converters 110A, 110B, 110C and 110D which are, in turn, connected to driver circuits 112A, 112B, 112C and 112D. The D/A converters 110A, 110B, 110C and 110D receive digital form suspension control signals SC derived by the microprocessor 100 and outputs analog form control signals representative thereof. In practice, the analog form suspension control signals have current values variable depending upon the desired fluid pressure in the working chambers of respectively corresponding hydraulic cylinders 26. The driver circuit 112A, 112B, 112C and 112D are designed to convert the suspension control signals in analog form to output driver signals as current signals for driving the proportioning solenoid coils 60 at the corresponding magnitude.

Here, the proportioning solenoid is generally connected to a driver circuit to receive driver current to drive a valve position for adjusting the pilot pressure at a desired pressure. The driver circuit adjusts a supply current toward a target current which is derived on the basis of a suspension control signal input from a control unit. Frequency characteristics of the supply current and the target current are so adjusted to have a linear relationship. In such a driver circuit, greater input gain is preferred for obtaining high response characteristics. On the other hand, for absorption of vibration energy the, hydraulic system in the pressure control valve is preferably provided great input frequency characteristics versus input vibration. To achieve the high input frequency characteristics in absorbing the vibration energy, an orifice is provided in a path establishing communication between the outlet of the pressure control valve and a feedback chamber. This orifice tends to serve as a resistance to the fluid flow and effective for providing high response in absorption of the vibration energy. However, on the other hand, this orifice serves as lag factor for response characteristics in attitude change suppressive mode operation in which the pilot pressure is controlled according to the driver current.

As seen, the neutral current $I_n$ is set at an intermediate value between the maximum and minimum current values $I_{max}$ and $I_{min}$.

Figure 9:
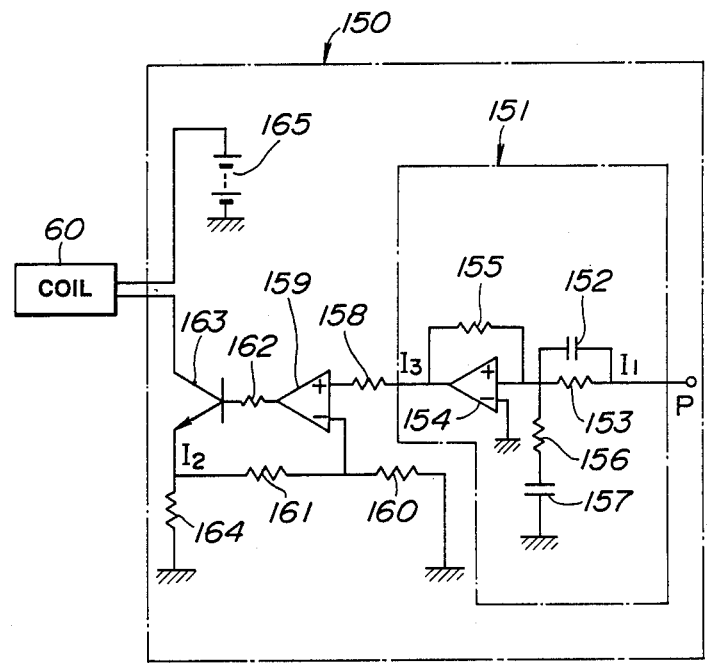
FIG. 9 is a circuit diagram of a driver circuit which is applicable for the suspension control system of FIG. 8.

FIG. 9 shows the shown embodiment of the pressure control valve 28 as associated with the preferred embodiment of the driver circuit 112 employed for controlling the operation of the proportioning solenoid valve. The driver circuit 112 is connected to the solenoid coil 60 of the actuator assembly 29. The driver circuit 112 includes a phase advance circuit 151. The phase advance circuit 151 comprises a capacitor 152 and a resistor 153 arranged in parallel relationship to each other with respect to an input terminal P. The parallel circuit of the capacitor 152 and the resistor 153 is connected to a differential amplifier 154 and a parallel resistor 155. A series circuit of a resistor 156 and a capacitor 157 is connected between the differential amplifier 154 and the junction of the parallel circuit of the capacitor 152 and the resistor 153. This series circuit connected to the ground. The output of the phase advance circuit 151 is connected to a differential amplifier 159 via a resistor 158. The differential amplifier 159 has the other input terminal connected to a junction between resistors 160 and 161. The output of the differential amplifier 159 is connected to the base electrode of a transistor 163 via a resistor 162. The emitter electrode of the transistor 163 is connected to a junction between the resistor 161 and a resistor 164 which is connected to the ground at the other end. The collector electrode of the transistor 163 is connected to a power source battery 165 via the solenoid coil 60.

The driver circuit 112 set forth above operates in the following manner. In response to vehicular body attitude change indicative input, the control unit 22 outputs the suspension control signal. The control signal is supplied in a form of a current signal having a current value representative of a desired magnitude of the pilot pressure. The current value of the control signal will be hereafter referred to as a "target current $I_1$". The target current $I_1$ is supplied to the non-inverting input terminal of the differential amplifier 154 of the phase advance circuit 151 through the input terminal P and the parallel circuit of the capacitor 152 and the resistor 153. Output of the differential amplifier 154 is fed back through the feedback resistor 155. The fed back output is summed with the input current at the summing junction connected to the non-inverting input terminal. As a result, phase of the output $I_3$ of the differential amplifier 154 is caused a phase shift in an advancing direction as shown in FIG. 11. The phase advanced output current $I_3$ of the differential amplifier 154 is fed to the non-inverting input terminal of the differential amplifier 159. The output of the differential amplifier 159 is supplied to the base electrode of the transistor 163. This causes a rising of the potential at the base electrode across the potential at the emitter electrode to cause the transistor turning ON. Therefore, the current corresponding to the current value $I_3$ is applied to the solenoid coil 60 to energize the latter. Therefore, the solenoid coil 60 is energized by the current with a primary lead phase.

Here, the current $I_2$ actually flowing through the solenoid coil can be detected as a terminal voltage at the resistor 164. Therefore, by connecting the resistor 164 to the inverting input terminal of the differential amplifier 159 via the resistor 161, the current values $I_3$ and $I_2$ can be compared and adjusted toward the current value $I_3$.

With such construction of the driver circuits 112 in the shown embodiment, satisfactorily high response characteristics can be obtained.

Figure 10:
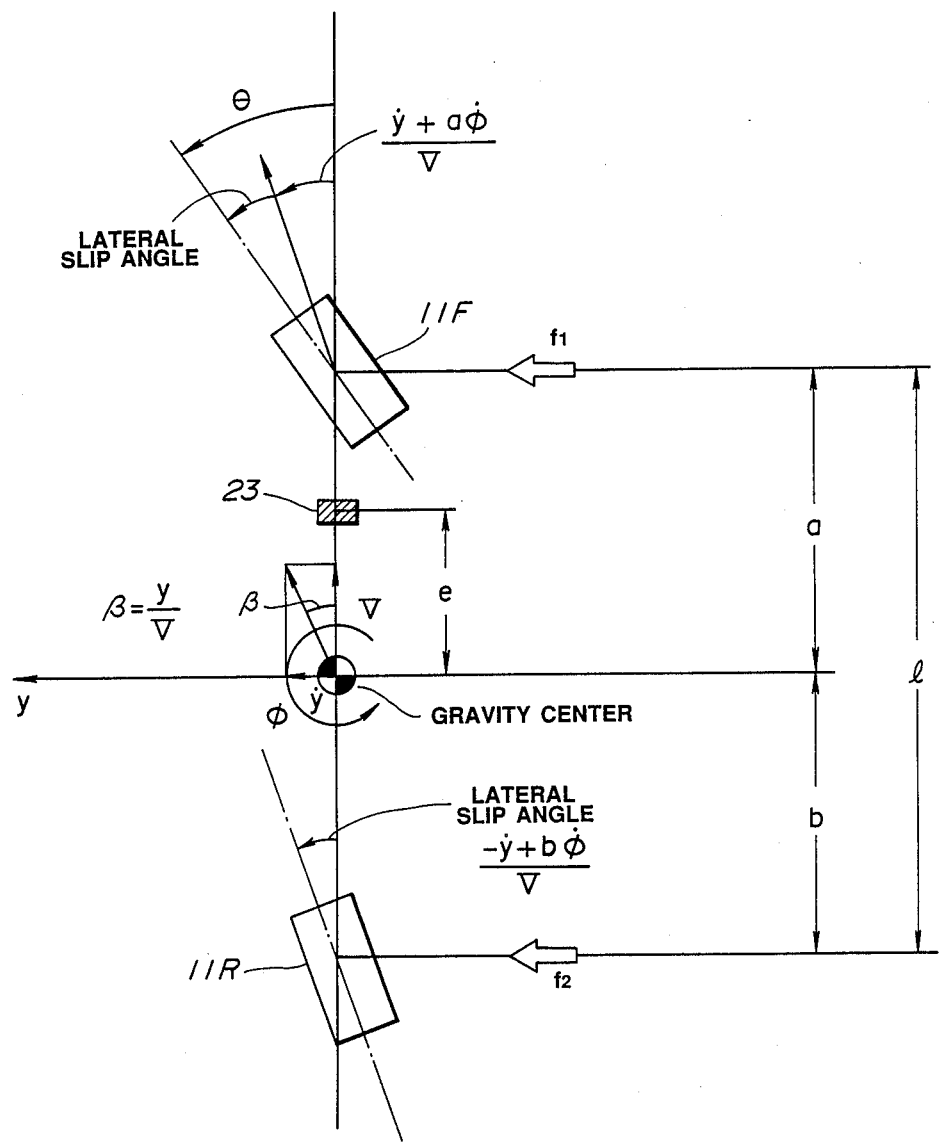
FIG. 10 is an illustration showing preferred position of the vehicular body for monitoring the lateral acceleration.
Figure 12B:
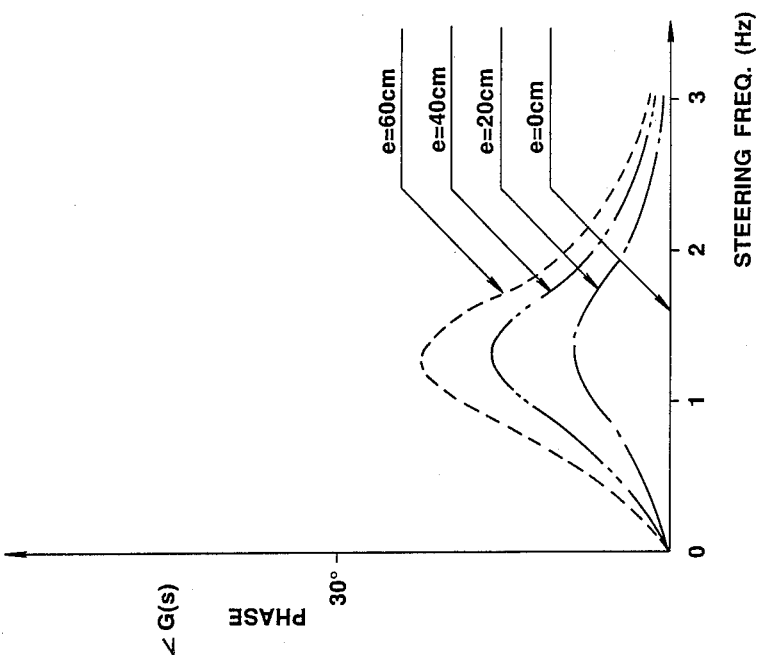
FIGS. 12(a) and 12(b) are graphs showing variation of gain and phase in the response transferring coefficient of output of lateral acceleration sensor taking a distance between the installing position and the gravity sensor as a parameter.
Figure 12A:
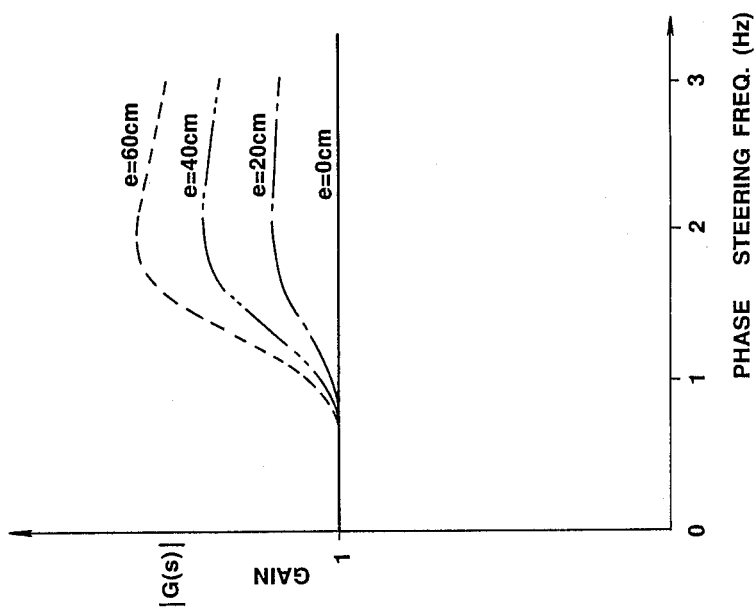

Hereafter, the operation of the preferred embodiment of the suspension control system set forth above will be discussed with reference to FIGS. 10 to 17. In advance of discussion about the detail of the control operation to be performed in the control system of FIG. 8 the, manner of derivation of the lateral acceleration utilizing the lateral acceleration sensor oriented at the frontwardly shifted orientation will be discussed in order to assist clear understanding of the invention. FIG. 10 shows a model of the vehicle in which the front-left and front-right wheels are represented by a front wheel oriented on the longitudinal axis and the rear-left and rear-right wheels are represented by a rear wheel oriented on the longitudinal axis, for simplication of the following discussion. As seen, the lateral acceleration sensor 23 is provided at a position on the longitudinal axis in a frontward direction in a magnitude of e from the gravity center $\dot{y}$.

In the model of FIG. 10, the following condition is set for analysis:

| | |
|---|---|
| Vehicular Weight: | M; |
| Yawing Moment at about Gravity Center: | I; |
| Wheel Base: | A; |
| Distance Between Front wheel and Gravity Center: | a; |
| Distance Between Rear wheel and Gravity Center: | b; |
| Vehicle Speed: | v; |
| Cornering Power at Front Wheel: | $C_1$; |
| Cornering Power at Rear Wheel: | $C_2$; |
| Steering Angle at Front Wheel: | $\theta$; |
| Lateral Displacement of Gravity Center: | y |

Here, fundamental equations are:

$$M(\alpha + V\dot{\phi}) = f_1 + f_2 \quad (1)$$

$$I\ddot{\alpha} = af_1 + bf_2 \quad (2)$$

where $\alpha + V\dot{\phi}$ is the lateral acceleration at the gravity center, $\dot{\phi}$ is the yawing rate, $\alpha$ is yawing angular acceleration, and $f_1$ and $f_2$ are cornering force at the front and rear wheels. The cornering forces $f_1$ and $f_2$ at the front and rear wheels can be illustrated as follows:

$$f_1 = C_1\{\theta - (a\dot{\phi} + \dot{y})/V\} \quad (3)a$$

$$f_2 = C_2\{-(\alpha + b\dot{\phi})/V\} \quad (3)b$$

wherein $\theta - (a\dot{\phi} + \dot{y})/V$ is lateral slip angle at the front wheel and $-(\alpha + b\dot{\phi})/V$ is lateral slip angle at the rear wheel.

Here, the lateral slip angle $\beta$ at the gravity center can be illustrated by:

$$\beta = y/V$$

The lateral slip angle $\beta$ increases in counterclockwise direction.

For deriving the lateral acceleration $\alpha + V\dot{\phi}$ and yawing rate $\dot{\phi}$ in relation to the actual steering angle $\theta$, Laplace transformation is made $$(\alpha + V\dot{\phi})/\theta$$

$$= \{A_2\omega_n^2 s d^2 + 2\epsilon_2\omega_2 s + \omega_2^2/\omega_2^2\}/(s^2 + 2\epsilon_n\omega_n s + \omega_n^2) \quad (4)$$

$$\dot{\phi}/\theta$$

$$= A_1\omega_n^2(1+T_1s)\}/(s^2 + 2\epsilon_n\omega_n s + \omega_n^2) \quad (5)$$

where $$\omega_n = (l/V)C_1C_2(1+KsV^2)/IM^{\frac{1}{2}}$$

$$\epsilon_n = \{(C_1+C_2)I + (a^2C_1+b^2C_2)/M\}/2l\,IMC_1C_2(1+KsV^2)^{\frac{1}{2}}$$

$$A_2 = V^2/\{l(1+KsV^2)\}$$

$$A_1 = V/\{l(1+KsV^2)\}$$

$$\omega_2 = (lC_2/I)^{\frac{1}{2}}$$

$$\epsilon_2 = (b/2V)(lC_2/I)^{\frac{1}{2}}$$

$$T_1 = (aMV)/lC_2$$

$$Ks = (M/l^2)(b/C_1 - a/C_2)$$

When the lateral acceleration sensor 23 is facilitated at the orientation as shown in FIG. 10, the lateral acceleration monitored by the lateral acceleration sensor 23 becomes a sum of the lateral acceleration $\alpha + V\dot{\phi}$ and the lateral acceleration $e\dot{\alpha}$ generated by the yawing angular acceleration $\dot{\alpha}$. Therefore, the lateral acceleration ($\alpha + V\dot{\phi} + e\dot{\alpha}$). Therefore, when transferring function Gs is set at a ratio of the lateral acceleration ($\alpha + V\dot{\phi}$) at the gravity center and the lateral acceleration ($\alpha + V\dot{\phi} + e\dot{\alpha}$) monitored by the lateral acceleration sensor, the transferring function can be described by:

$$\begin{aligned}Gs &= (\alpha + V\dot{\phi} + e\dot{\alpha})/(\alpha + V\dot{\phi}) \\ &= \{(A_2/\omega_2^2 + eA_1\tau_1)s^2 + A_2/\omega_2 2\xi_2 + eA_1)s + A_2\} \\ &\quad /\{(A_2/\omega_2^2)s^2 + (A_2/\omega_2)2\xi_2 s + A_2\}\end{aligned} \quad (6)$$

Utilizing the equation (6) and with taking vehicle speed V and the distance e between the gravity center and the sensor position as parameters, characteristics of gain and phase as illustrated in FIGS. 11(a), 11(b) and 12(a), 12(b) could be obtained. As seen from FIGS. 11(a), 11(b) and 12(a), 12(b), gain became greater and phase advance was improved by increasing the distance e. Phase advance is also improved at higher vehicle speed for quick steering operation which has general characteristics of 1 to 2 Hz. On the other hand, rolling rate characteristics $\gamma$ in relation to the actual steering angle $\theta$ is variable depending upon steering frequency and the distance e, as shown in FIGS. 13(a) and 13(b). Except for the racing cars, usual steering frequency is less than or equal to 2 Hz. In order to make $\gamma/\theta$ smaller, the distance e has to be selected at an appropriate distance. The appropriate distance in this view point is variable depending upon the specification of the vehicles to apply. However, in general, for the passenger's car, the frequency at around 1 Hz is important. As will be appreciated, the roll gain will become excessive when the distance e becomes excessively longer. Therefore, the preferred range of the distance e is 20 to 40 cm from the gravity center.

Figure 14:
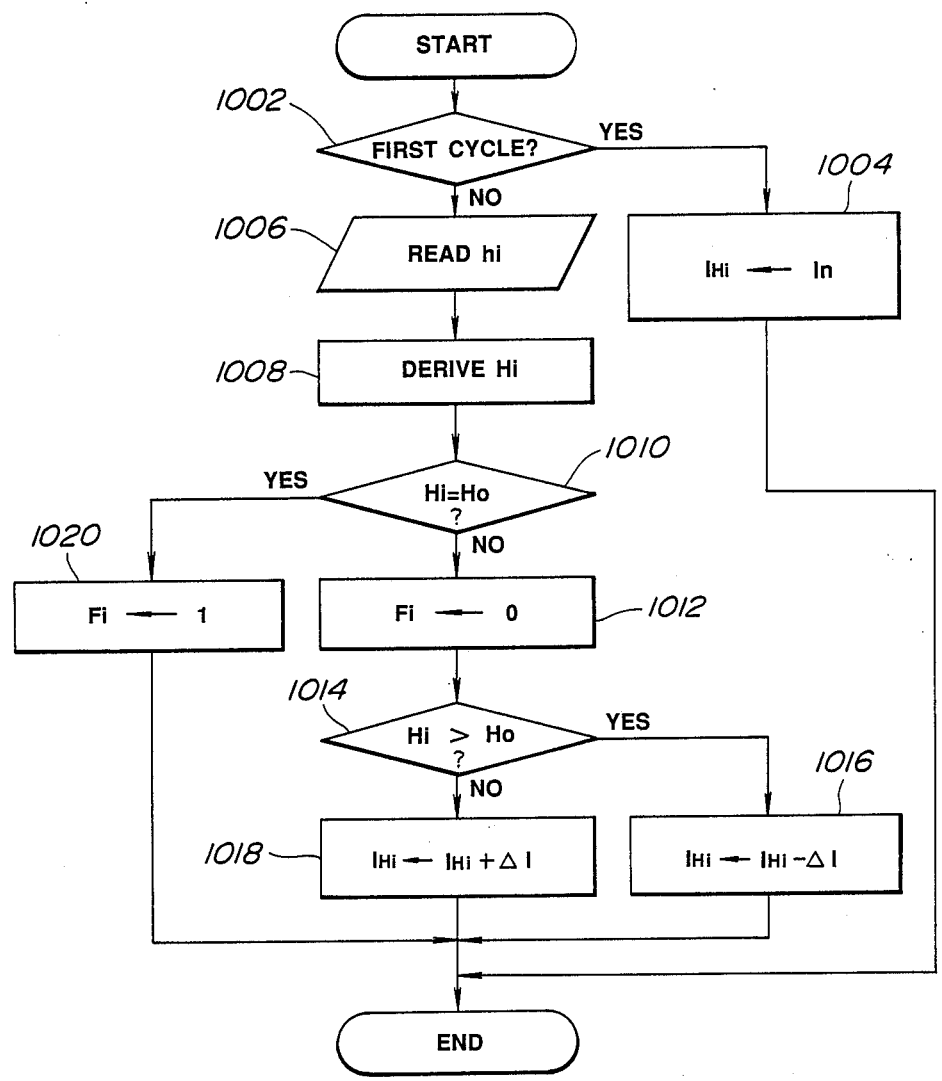
FIG. 14 is a flowchart of a routine for controlling or regulating vehicular height level at respective suspension system.
Figure 15:
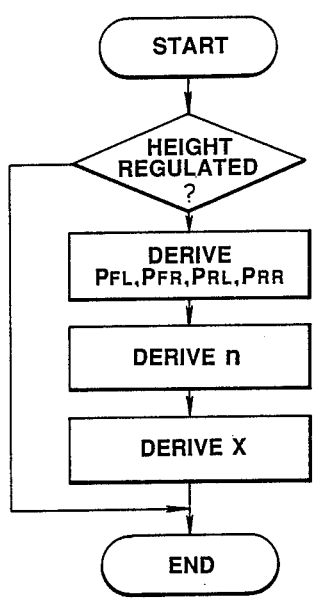
FIG. 15 is a flowchart of a routine for deriving an orientation to monitor the lateral acceleration.
Figure 16:
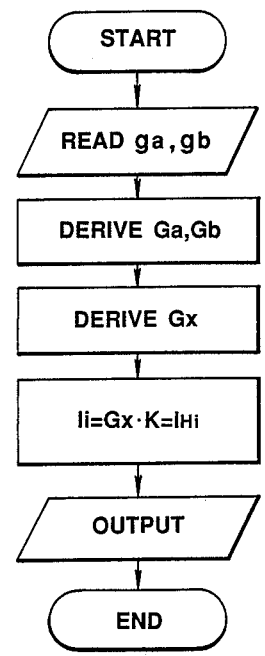
FIG. 16 is a flowchart of a routine for deriving an anti-rolling suspension control signal.

The process of control operation performed in the control unit 22 will be discussed hereinbelow with reference to FIGS. 14, 15, 16 and 17. The microprocessor 100 is triggered by turning ON of the ignition switch to initiate control operations. The control unit 22 performs various control operations as governed by a main program which is executed as a background job. The routines FIGS. 14, 15 and 16 are triggered at respectively predetermined timings, e.g. every 20 msec. The routine of FIG. 14 is triggered and executed for each one of suspension systems. Immediately after starting execution, a check is performed whether the current execution cycle is the first cycle after turning on the ignition switch at a step 1002. Practically, a check is performed by checking a initialization flag in a flag register (not shown) in the microprocessor. The initialization flag may be held reset until the first cycle of routine is executed. On the other hand, the initialization flag is set in the first execution cycle and held at set condition until the ignition switch is turned OFF.

When the current execution cycle is the first cycle as checked at the step 1002, the suspension control signal value $I_{Hi}$ is set at an initial value which corresponds to the neutral current value $I_N$. Therefore, by this, the fluid pressure in the working chamber of the corresponding hydraulic cylinder 26 is set at the neutral pressure $P_n$, at a step 1004. After the process at the step 1004, the process goes to END.

On the other hand, when the current execution cycle is not the first cycle as checked at the step 1002, corresponding one of vehicle height indicative signal $h_i$ (i = 1, 2, 3, 4) is read out at a step 1006. On the basis of the read out vehicle height indicative signal $h_i$, a vehicle height data $H_i$ is derived at a step 1008. The vehicle height data $H_i$ is then compared with a reference height value $H_O$ which represents standard height with standard load on the engine at the neutral pressure $P_N$ of the working chamber 26d of the corresponding hydraulic cylinder, at a step 1010.

If the vehicle height data $H_i$ is not equal to the standard height value $H_O$ as checked at the step 1010, a standard height indicative flag $F_i$ which is also set and reset in the flag register in the arithmetic circuit of the microprocessor, is reset at a step 1012. Then, a check is performed whether the vehicle height data $H_i$ is greater than the reference height value $H_O$, at a step 1014. When the vehicle height data $H_i$ is greater than the reference height value $H_O$ as checked at the step 1014, the suspension control signal value is modified by reducing a predetermined value $\Delta I$ from the current suspension control signal value $I_{Hi}$ at a step 1016. On the other hand, when the vehicle height data $H_i$ is not greater than the reference height value $H_O$ which implies that the vehicle height data $H_i$ is smaller than the reference height data $H_O$, the suspension control signal value $I_{Hi}$ is modified by adding the predetermined value $\Delta I$, at a step 1018. After one of the steps 1016 and 1018, process goes END and return to the background job.

On the other hand, when the vehicle height data $H_i$ is equal to the reference height data $H_O$ as checked at the step 1010, the standard height indicative flag $F_i$ is set at a step 1020. Thereafter, process goes to END and the process returns to the background job.

As will be appreciated herefrom, through the process of the routine of FIG. 14, vehicular height regulation is accomplished. Therefore, as long as no lateral acceleration is monitored and thus the system does not have anti-rolling suspension control, the vehicle height at each suspension system can be maintained at the standard height.

The routine of FIG. 15 is also triggered at every fixed interval, e.g. 20 msec. Immediately after starting execution, a check is performed whether all of the vehicle height data $H_i$ ($i = 1, 2, 3, 4$) of respective suspension systems are equal to the reference height data $H_O$ at a step 1102. If any one of the vehicle height data $H_i$ is not equal to the reference height value $H_O$ as checked at the step 1102, then, the process goes END and returns to the background job. On the other hand, when all of the vehicle height data $H_i$ as checked at the step 1102 are equal to the reference height value $H_O$, fluid pressure $P_{FL}$, $P_{FR}$, $P_{RL}$ and $P_{RR}$ in the working chambers 26d of respective hydraulic cylinders 26FL, 26FR, 26RL and 26RR are derived at a step 1104. The fluid pressure in the working chamber is arithmetically derived on the basis of the suspension control signal value supplied to respectively corresponding driver circuits.

Based on the fluid pressure $P_{FL}$, $P_{FR}$, $P_{RL}$ and $P_{RR}$ in the working chambers 26d of respective hydraulic cylinders 26FL, 26FR, 26RL and 26RR derived at the step 1104, load distribution $\eta$ between the front suspension systems 14FL and 14FR and the rear suspension systems 14RL and 14RR is derived from the following equation, at a step 1106:

$$\eta = (P_{RL} + P_{RR})/(P_{FL} + P_{FR})$$

Figure 6:
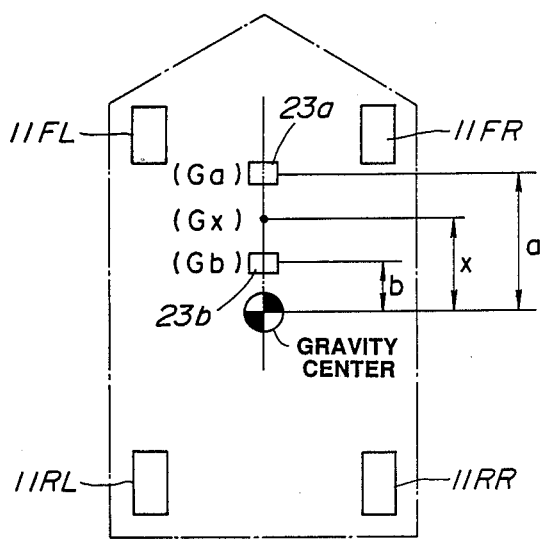
FIG. 6 is an illustration showing orientations to arrange lateral acceleration sensors in the preferred embodiment of the actively controlles suspension system according to the present invention.
Figure 17:
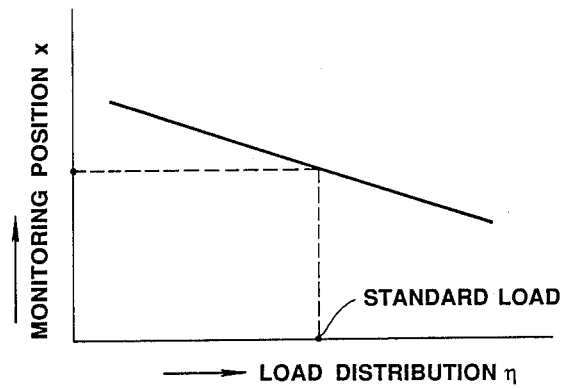
FIG. 17 is a chart showing relationship between the orientation to monitor the lateral acceleration and a longitudinal load distribution.

The table look-up is then performed in terms of the load distribution $\eta$ derived at the step 1106 against a table of FIG. 17 for deriving a monitoring point x between the positions of the lateral acceleration sensors 23a and 23b shown in FIG. 6, at a step 1108. Thereafter, the process goes to END and returns to the background job.

The process of routine in FIG. 16 is triggered at every predetermined timing, e.g. 20 msec. Immediately after starting execution, the lateral acceleration indicative signal values ga and gb input from the lateral acceleration sensors 23a and 23b are read out at a step 1202. Based on the lateral acceleration indicative signal values ga and gb as read at the step 1202, the lateral acceleration data Ga and Gb at respective sensor positions are derived at the step 1204. Based on the lateral acceleration data Ga and Gb as derived at the step 1204 and the monitoring position data x derived through the process of routine in FIG. 15, the lateral acceleration data Gx at the monitoring point x is derived at a step 1206. Derivation of the lateral acceleration data Gx at the monitoring point x is performed according to the following equation:

$$Gx = \{(x-b)/(a-b)\}Ga + \{(a-x)/(a-b)\}Gb$$

The suspension control signal value Ii for anti-rolling suspension control and to be supplied to each of the driver circuits, is then derived according to the following equation, at a step 1208.

$$Ii = Gx \times K + I_{Hi}$$

where K is a proportional gain

Then, the suspension control signal Sc is output to each of corresponding driver circuits at a step 1210. After the process at the step 1210, process goes to END and returns to the background job.

In the practical operation, the suspension control systems intially operates to set the fluid pressure in the working chambers 26d of the respective hydraulic cylinders 26FL, 26FR, 26RL and 26RR at the neutral pressure $P_N$, upon ON-set of power supply. Then, vehicle height regulating operation is performed for respective suspension systems by adjusting fluid pressure in respective working chambers 26d of the hydraulic cylinders 26FL, 26FR, 26RL and 26RR. Through this height regulating operation, the vehicular heights at respective suspension systems are adjusting to the standard height as represented by the reference height value $H_O$. When the vehicular height regulation is completed, the lateral acceleration monitoring point x is set in connection with the load distribution derived in terms of the fluid pressure at respective working chambers 26d. The lateral acceleration monitoring point x is then used for anti-rolling mode suspension control which is triggered in response to the lateral acceleration exerted on the vehicle body.

Assuming right hand steering is made at a certain vehicle speed, vehicular rolling in a counterclockwise direction is caused to lower the vehicle height at the front-left and rear-left suspensions and to lift up the vehicle height at the front-right and rear-right suspensions. Therefore, the lateral acceleration sensors 23a and 23b outputs lateral acceleration indicative signals ga and gb. As clear from FIG. 7, both of the lateral acceleration indicative signal values ga and gb are positive. Therefore, accordingly, the lateral acceleration data Gx derived with respect to the monitoring point x becomes positive value. The lateral accelerations data Gx which is arithmetically obtained contains component of the lateral acceleration $\alpha + V\dot{\phi}$ at the gravity center and component $x\ddot{\alpha}$ compensating phase advance due to yawing angular acceleration $\ddot{\alpha}$. Therefore, the suspension control signals derived with respect to the lateral acceleration data Gx, may compensate influence of phase advance caused by distance between the lateral acceleration sensor position and the gravity center which can be shifted depending upon the load distribution.

As will be appreciated herefrom, according to the shown embodiment, influence of the lag time of the pressure control valve and the lag in the control system can be successfully avoided.

While the present invention has been disclosed in terms of the preferred embodiment in order to facilitate better understanding of the invention, it should be appreciated that the invnetion can be embodied in various ways without departing from the principle of the invention. Therefore, the invention should be understood to include all possible embodiments and modifications to the shown embodiments which can be embodied without departing from the principle of the invention set out in the appended claims.

Figure 19:
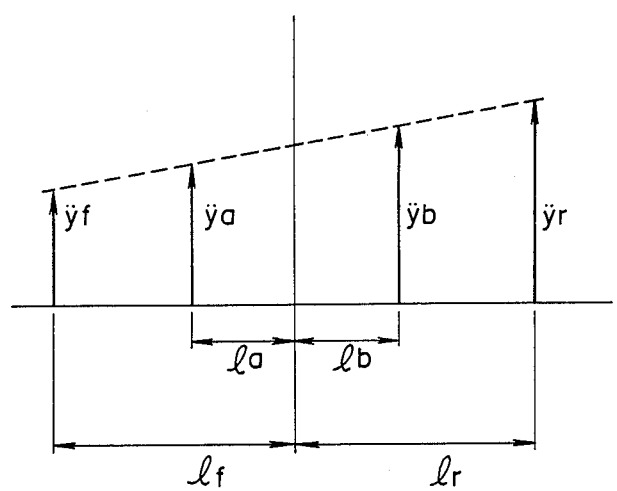
FIG. 19 is an illustration showing the manner of extrapolation for deriving lateral acceleration an intermediate points.
Figure 20:
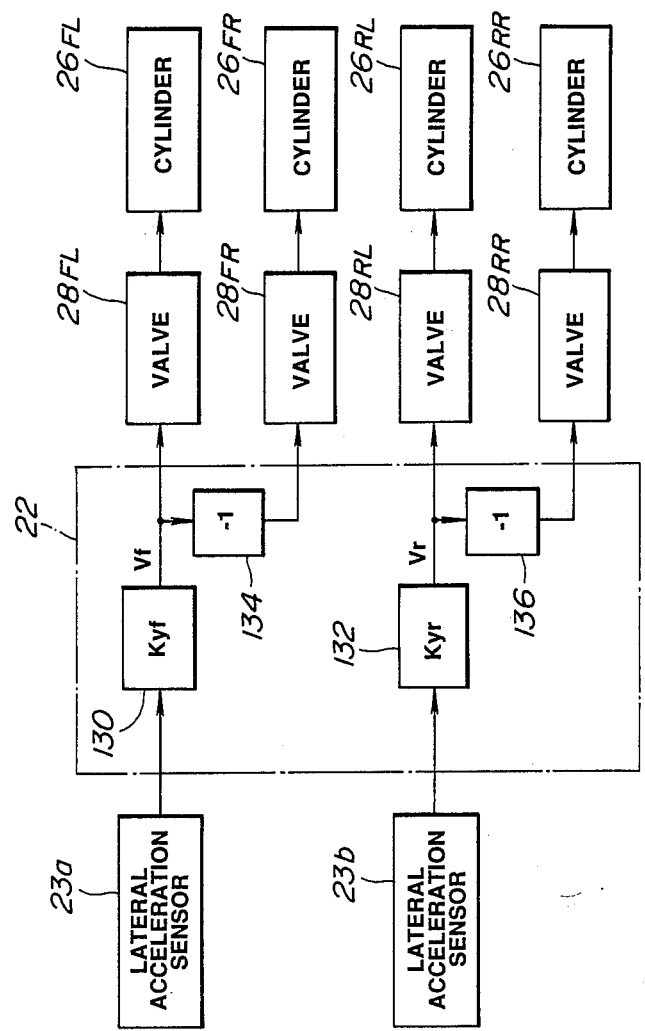
FIG. 20 is a block diagram of another embodiment of a control system to be employed in the preferred embodiment of the actively controlled suspension system according to the invention.

For example, though the shown embodiments is directed to the hydraulic suspension system to implement height regulation and attitude regulation, the present invention is applicable not only for the hydraulic suspension system but also for the pneumatic suspension system, hydropneumatic suspension system and so forth. Furthermore, though the shown embodiment facilitates both of the lateral acceleration sensors at the positions frontwardly distanced from the gravity center, the orientation of the two lateral acceleration sensors can be modified in any appropriate arrangement. For example, FIGS. 18, 19 and 20 illustrates a modification of the suspension control system which is also applicable for implementing the present invention.

Figure 18:
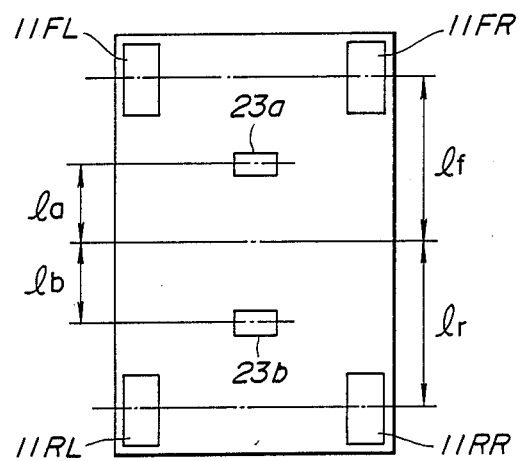
FIG. 18 is an illustration showing another layout of the lateral acceleration sensors which may be applicable for the suspension control system.

As seen from FIG. 18, the lateral acceleration sensors 23a and 23b arranged at frontwardly and rearwardly distanced orientations with respect to the gravity center. In the practical embodiments, the lateral acceleration sensor 23a is positioned on the longitudinal axis and at a position frontwardly distanced from the gravity center in a magnitude of la which is shorter than a distance lf between the gravity center and the center of the front wheels 11FL and 11FR. On the other hand, the lateral acceleration sensor 23b is positioned on the longitudinal axis and at a position rearwardly distanced from the gravity center in a magnitude of lb which is shorter than a distance lr between the gravity center and the center of the rear wheels 11RL and 11RR. The lateral acceleration gf and gr to be exerted on the vehicle at the longitudinal positions corresponding to the center of the front and rear wheels can be derived from the following equations:

$$gf = (la \times ga + lb \times gb)/2 + lf \times (ga - gb)/(la + lb)$$

$$gr = (la \times gb + lb \times ga)/2 + lr \times (ga - gb)/(la + lb)$$

As will be appreciated herefrom, the linear extrapolation can be performed based on the known distance between the lateral acceleration sensors (la+lb), difference (ga−gb) of the lateral acceleration indicative signals of the lateral acceleration sensors and the known distances lf and lr, as shown in FIG. 19.

FIG. 20 is a schematic block diagram of the modified suspension control system implementing the present invention. In the circuit of FIG. 20, the control unit 22 is composed of gain controlled amplifiers 130 and 132 respectively connected to the lateral acceleration sensors 23a and 23b. Respective amplifiers 130 and 132 are set amplifier gains at Kyf and Kyr. The amplifier 130 is directly connected to the solenoid coil 60 of the presence control valve 28FL and connected to the solenoid coil 60 of the pressure control valve 28FR via an inverter 134. Similarly, the amplifier 132 is directly connected to the solenoid coil 60 of the pressure control valve 28RL and connected to the solenoid coil 60 of the pressure control valve 28RR via an inverter 136.

In this case, the gains Kyf and Kyr of the amplifiers 130 and 132 may be adjusted so as to comparate the difference between the values of the lateral acceleration indicative signal values ga and gb of the lateral acceleration sensors 23a and 23b.

It should be noted through the shown embodiment places the lateral acceleration sensors 23a and 23b at positions longitudinally from the positions of the centers of the front and rear wheels, it is of course possible to arrange the lateral acceleration sensors at the longitudinal orientations corresponding to the center of the front and rear wheels. In such case, the gain of the amplifiers 130 and 132 in the circuit of FIG. 20 may be set at values simply for achieving desired response characteristics.

As will be appreciated herefrom, the present invention fulfills all of the objects and advantages sought therefor.

What is claimed is:

1. An actively controlled suspension system for an automotive vehicle, comprising:
   a cylinder disposed between a vehicle body and a suspension member which rotatably supports a road wheel, said cylinder defining a variable pressure working chamber filled with a pressure medium for generating a damping force resisting against relative displacement between said vehicle body and said suspension member, said pressure of said pressure medium being variable between a predetermined maximum value and a predetermined minimum value across a predetermined neutral value;
   a pressure source circuit means connected to said working chamber for supplying the pressure medium and including a pressure source feeding pressurized pressure medium through said circuit;
   a pressure control valve disposed between said pressure source and said working chamber, said pressure control valve being capable of varying valve positions between a first mode for increasing pressure if said pressure medium within said working chamber, a second mode for decreasing pressure in said pressure within said working source, and a third mode for maintaining said pressure in said pressure medium constant;
   a first acceleration sensor for monitoring an acceleration exerted on a first position of the vehicle body to cause vehicular attitude change and producing a first sensor signal indicative thereof;
   a second acceleration sensor oriented at a second position which is longitudinally distanced from said first acceleration sensor, for monitoring said acceleration exerted on the second position of the vehicle body and producing a second sensor signal indicative thereof; and
   a controller means for receiving said first and second acceleration sensor signals for deriving a suspension control signal for operating said pressure control valve at one of said first, second and third mode positions for regulating vehicular attitude on the basis of said first and second signals.

2. An actively controlled suspension system as set forth in claim 1, wherein said first and second acceleration sensors are arranged at said first and second positions both of which are frontwardly distanced from an initial gravity center which is determined at a standard load condition of the vehicle and at said neutral value of pressure of said pressure medium in said working chamber.

3. An actively controlled suspension system as set forth in claim 2, which further comprises a vehicle height sensor for monitoring vehicular height level at a set of front and rear wheels of said vehicular body, and said controller means performs height regulating mode operation for adjusting said pressure of said pressure medium in said working chamber by controlling operation of said pressure control valve means so that the vehicular height at said front and rear wheels are maintained at a predetermined height position.

4. An actively controlled suspension system as set forth in claim 3, wherein said hydraulic cylinder and said pressure control valve means are provided for each of the suspension systems respectively associated with said front and rear wheels, and said controller means detects load distribution between said front and rear wheels on the basis of said pressure of said pressure medium of the working chambers of the respective hydraulic cylinders and determines a longitudinal position to monitor said acceleration, said controller means derives said acceleration at said longitudinal position on the basis of said first and second sensor signals and the known distance of said longitudinal position relative to said first and second positions.

5. An actively controlled suspension system as set forth in claim 1, wherein said first sensor is arranged at said first position frontwardly distanced from a gravity center of said vehicle body and said second sensor is arranged at said second position rearwardly distanced from said gravity center.

6. An actively controlled supension system as set forth in claim 5, wherein said hydraulic cylinder and said pressure control valve means are provided for each of suspension systems respectively associated with said front and rear wheels, and said controller means derives said suspension control signal for said pressure control valve means associated with said suspension systems of said front wheels on the basis of said first sensor signal and said suspension control signal for said pressure control valve means associated with said suspension systems of said rear wheels on the basis of said second sensor signal.

7. An actively controlled suspension system as set forth in claim 6, wherein said first and second acceleration sensors are respectively oriented at first and second positions respectively corresponding to longitudinal positions of centers of said front and rear wheels.

8. An actively controlled suspension system as set forth in claim 6, wherein said first and second acceleration sensors are respectively oriented at said first and second positions having a known distance to said gravity center and a known distance to the longitudinal positions of centers of said front and rear wheels, and said controller means derives acceleration at respective centers of said front and rear wheels by extrapolation and derives said suspension control signals on the basis of said extrapolated values.

9. An anti-rolling suspension control system for an automotive vehicle, comprising:
a cylinder disposed between a vehicle body and a suspension member which rotatably supports a road wheel, said cylinder defining a variable pressure working chamber filled with a pressure medium for generating a damping force resisting against relative displacement between said vehicle body and said suspension member, a pressure of said pressure medium being variable between a predetermined maximum value and a predetermined minimum value across a predetermined neutral value;
a pressure source circuit means connected to said working chamber for supplying said pressure medium and including a pressure source feeding pressurized medium through said circuit;
a pressure control valve disposed between said pressure source and said working chamber, said pressure control valve being capable of varying valve positions between a first mode for increasing pressure of said pressure medium within said working chamber, a second mode for decreasing pressure in said pressure within said working source, and a third mode for maintaining said pressure in said pressure medium constant;
a first lateral acceleration sensor for monitoring a lateral acceleration exerted on the first position of the vehicle body to cause vehicular attitude change and producing a first sensor signal indicative thereof;
a second lateral acceleration sensor oriented at a second position which is longitudinally distanced from said first lateral acceleration sensor, for monitoring said lateral acceleration exerted on the second position of the vehicle body and producing a second sensor signal indicative thereof; and
controller means for receiving said first and second sensor signals for deriving a suspension control signal for operating said pressure control valve at one of said first, second and third mode positions for regulating vehicular attitude on the basis of said first and second sensor signals.

10. An anti-rolling suspension control system as set forth in claim 9, wherein said first and second lateral acceleration sensors are arranged at said first and second positions both of which are frontwardly distanced from an initial gravity center which is determined at a standard load condition of the vehicle and at said neutral valve of pressure of said pressure medium in said working chamber.

11. An anti-rolling suspension control system as set forth in claim 10, which further comprises a vehicle height sensors for monitoring vehicular height level at a set of front and rear wheels of said vehicular body, and said controller means performs height regulating mode operation for adjusting said pressure of said pressure medium in said working chamber by controlling the operation of said pressure control valve means so that the vehicular height at said front and rear wheels is maintained at a predetermined height position.

12. An anti-rolling suspension control system as set forth in claim 11, wherein said hydraulic cylinder and said pressure control valve means are provided for each of the suspension systems respectively associated with said front and rear wheels, and said controller means detects load distribution between said front and rear wheels on the basis of said pressure of said pressure medium of working chambers of respective hydraulic cylinders and determines a longitudinal position to monitor said lateral acceleration, said controller means derives said lateral acceleration at said longitudinal position on the basis of said first and second sensor signals and a known distance of said longitudinal position relative to said first and second positions.

13. An anti-rolling suspension control system as set forth in claim 9, wherein said first sensor is arranged at said first position frontwardly distanced from a gravity center of said vehicle body and said second sensor is arranged at said second position rearwardly distanced from said gravity center.

14. An anti-rolling suspension control system as set forth in claim 13, wherein said hydralic cylinder and said pressure control valve means are provided for each of the suspension systems respectively associated with said front and rear wheels, and said controller means derives said suspension control signal for said pressure control valve means associated with said suspension system of said front wheels on the basis of said first sensor signal and said suspension control signal for said pressure control valve means associated with said suspension system of said rear wheels on the basis of said second sensor signal.

15. An anti-rolling suspension control system as set forth in claim 14, wherein said first and second lateral acceleration sensors are respectively oriented at first and second positions respectively corresponding to longitudinal positions of centers of said front and rear wheels.

16. An anti-rolling suspension control system as set forth in claim 15, wherein said first and second lateral acceleration sensors are respectively oriented at said first and second positions having a known distance to said gravity center and a known distance to the longitudinal positions of centers of said front and rear wheels, and said controller means derives lateral acceleration at the respective centers of said front and rear wheels by extrapolation and derives said suspension control signals on the basis of said extrapolated values.

* * * * *